United States Patent [19]

Bremer, Jr.

[11] 4,339,963
[45] Jul. 20, 1982

[54] VISCOUS DAMPER

[75] Inventor: Robert C. Bremer, Jr., Brownsburg, Ind.

[73] Assignee: Wallace Murray Corporation, New York, N.Y.

[21] Appl. No.: 955,209

[22] Filed: Oct. 27, 1978

[51] Int. Cl.³ .................. F16F 15/10; F16F 15/22
[52] U.S. Cl. .................... 74/574; 74/573 F; 74/604
[58] Field of Search ............ 74/604, 574, 573; 64/27 NM

[56] References Cited

U.S. PATENT DOCUMENTS

| 379,022 | 3/1888 | Morgan | 74/574 |
|---|---|---|---|
| T973,005 | 8/1978 | Shyu et al. | 74/574 |
| 1,925,072 | 8/1933 | Goiswold | 74/574 |
| 2,073,661 | 3/1937 | Tibbetts | 74/574 |
| 2,667,767 | 2/1954 | Burrell | 64/27 R X |
| 2,671,488 | 3/1954 | Christensen | 64/27 NM X |
| 3,603,172 | 9/1971 | Hall | 74/574 |
| 3,986,411 | 10/1976 | Kirby | 74/574 |
| 3,992,963 | 11/1976 | Khanna | 74/574 |

FOREIGN PATENT DOCUMENTS

| 876921 | 11/1942 | France | 74/574 |
| 307921 | 10/1929 | United Kingdom | 74/574 |
| 736808 | 9/1955 | United Kingdom | 74/574 |

Primary Examiner—Leslie Braun
Attorney, Agent, or Firm—Thomas J. Greer, Jr.

[57] ABSTRACT

A torsional vibration damper of the type having an inertia ring secured to a hub, the hub being coupled to the crankshaft of an internal combustion engine. Elastomer members are sandwiched between the hub and inertia ring. The improvement of this invention relates to a radially inwardly extending tongue carried by the inertia ring, a portion of which is sandwiched by the elastomer members. A viscous shear liquid is carried by an annular internal cavity of the hub, the radially innermost portion of the tongue immersed in the shear liquid.

3 Claims, 1 Drawing Figure

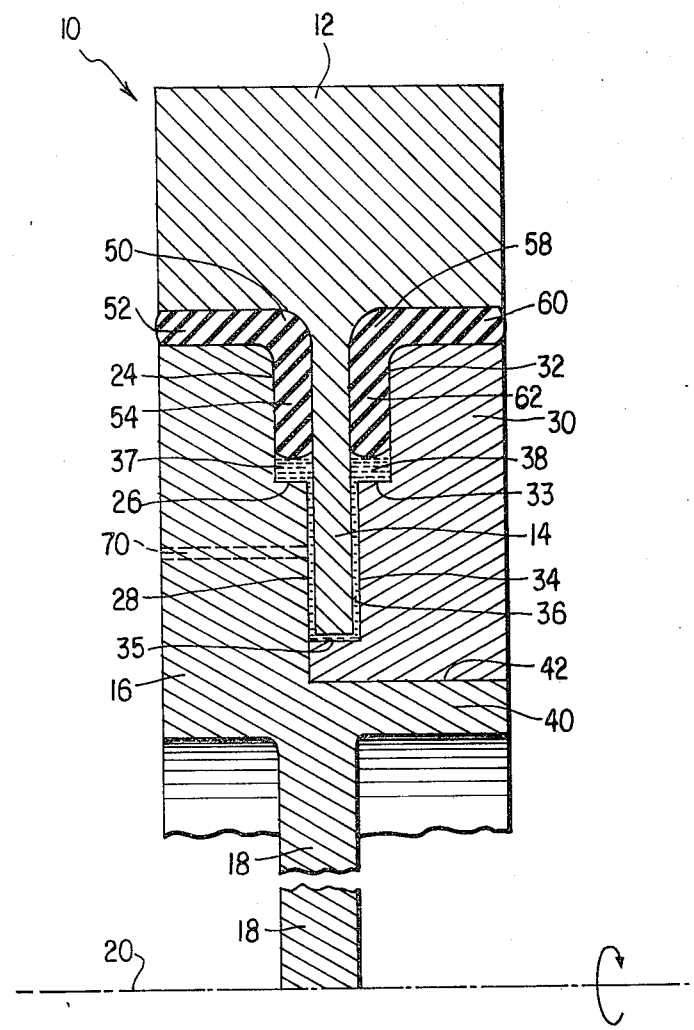

VISCOUS DAMPER

This invention relates to torsional vibration dampers of the type having a hub secured to an outer inertia member by an elastomer annulus.

The invention exhibits particular utility to the damping of torsional vibrations in internal combustion engines. Such dampers are generally classified at present in Class 74, such-class 574 in the U.S. Patent Office. Torsional vibrations may be considered as back-and-forth twistings of the crankshaft of an internal combustion engine, superimposed upon the main, unidirectional rotation of the crankshaft. Unless controlled, such torsional vibrations will often lead to failure of the crankshaft, as well as contributing to failure in other parts of the engine or its cooling system, particularly where one of the resonant frequencies of the crankshaft coincides with the particular firing frequency of the engine or a particular harmonic of that frequency. According to present theory of elastomer vibration dampers, a portion of the torsional vibrational energy transmitted to the crankshaft by the action of the pistons is converted into heat in the elastomer. The elastomer may accordingly be considered as a drain or sump which continually receives a portion of the energy which causes torsional vibrations.

A common form of such a damping device includes an outer or inertia member in the form of a ring or annulus of some significant mass. The inner portion of this ring is attached to an elastomer annulus which, in turn, is secured to a hub or other element in turn attached to the rotating crankshaft of an engine. Both the hub and the inertia members may be of cast iron. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 rpm simultaneously executed angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

As an internal combustion engine is operated at various engine speeds, several vibrational frequencies appear on the crankshaft. In general, most automotive and diesel engines of present design and not utilizing a torsional vibration damper have one fairly high amplitude resonant frequency within the engine operating range of speeds. However, at any given engine speed, torsional vibrations from various orders of vibration are present and can be significant.

For a given damper application, i.e., a damper for a specific engine, it is known in the art to use as much elastomer (volume wise) with as much shear area (interface area between metal elastomer) as possible to minimize both the power absorbed per unit of volume and also to minimize shear stress. In practice, space limitations preclude simply expanding the width or the diameter of the damper to achieve these low values.

The practice of this invention facilitates the design of torsional vibration dampers having these desirable properties within given space limitations. The damper of this invention also exhibits high radial and axial stiffness.

IN THE DRAWING

Referring now to the drawing, the torsional vibration damper of this invention is illustrated in half-axial cross-section, showing the upper half only, denoted by the numeral 10. The reader will understand that a full axial cross-section would be simply the mirror image and would extend below the axis of rotation indicated by the numeral 20.

Numeral 12 denotes an annular inertia ring formed of iron or other heavy and strong material, the ring 12 including an integral, radially inwardly extending tongue 14. The numeral 16 denotes one portion of a two-piece hub, the radially innermost portion of the hub having an integral web portion 18. As is conventional, web portion 18 is suitable coupled (not illustrated) to the crankshaft of an internal combustion engine, the crankshaft rotating about an axis indicated by the numeral 20. The exact manner of affixing the web 18 to the crankshaft is well known and forms no part of this invention. The numeral 24 and 26 denote, respectively, radial and axial surfaces of hub piece 16, these surfaces defining, with tongue 14, a cavity which receives the radially extending portion of an elastomer member (later to be described). The numeral 28 denotes a radially extending surface of hub piece 16, surface 28 extending from axially extending surface 26 to flange portion 40 (later to be described). The numeral 30 denotes a clamping ring which forms the other piece of the two-piece hub. Numeral 32 denotes a radially extending surface of continuous annular extent on clamping ring 30, while the numeral 33 denotes an axially extending portion. Portions 32 and 33, with tongue 14, define an annular groove. The reader will immediately recognize that surfaces 24 and 32 are homologous. The numeral 34 denotes a radially extending annular surface extending from axial surface 33 to axially extending surface 35 of clamping ring 30. Surfaces 28, 34 and 35 define a radially innermost continuous annular cavity denotes by the numeral 36. The radially innermost portion of tongue 14 extends into cavity 36, the cavity being filled with a viscous shear liquid. Viscous shear liquids for use in torsional vibration dampers are old and the composition of such liquids is accordingly well known. The numerals 37 and 38 denote, respectively, annular recesses which are located between surfaces 24 and 32, and the radially innermost portions 26 and 33, and the radially innermost portions of elastomer members presently to be described, and the sides of tongue 14.

The numeral 40 denotes an axially extending flange which is integral with hub piece 16, the radially outermost portion of flange 40 having a surface 42 which is interference fit, such as a class FN 5 interference, with the inside diameter of clamp ring 30.

The numeral 50 denotes an angularly continuous elastomer member having a radially extending portion 52 and an axially extending portion 54. Similarly, the numeral 58 denotes another elastomer member or element having a radially extending portion 60 and an axially extending portion 62.

The numeral 70 denotes a filler port through which viscous shear liquid is inserted into cavity 36. The amount of liquid inserted in such as to completely fill annular cavity 36 (with tongue 14 therein) as well as annular cavities 37 and 38. The clearance between the sides of tongue 14 and the facing portions of the two-piece hub are, in accordance with practices known in this art, very small, i.e., on the order of a few thousandths of an inch. As is known in this art, the effectiveness of a shear viscous liquid in resisting relative rotation between adjacent parts generally is high at such shear liquid film thickness.

The device is assembled in a manner similar to that shown in my co-pending application Ser. No. 724,058, filed Sept. 16, 1976, and entitled "Torsional Vibration Damper" now U.S. Pat. No. 4,150,587, hereby incorporated by reference. Thus, as taught in that document, elastomer elements 50 and 58 are, prior to assembly, radially extending and flattened rings. As a consequence of this manner of assembly, radially extending elastomer portions 54 and 62 are compressed normally to their surfaces engaged by the hub and inertia ring, as are axially extending elastomer portions 52 and 60. The several procedures for effecting the class FN 5 interference fit are well known in the art. For instance, the clamping ring 30 is expanded as by heating so that its innermost diameter fits over the outermost portion of hub piece 16 at surface 42 and is then allowed to contract as by cooling, thereby defining the interference fit. Thus, no auxiliary bolts or other fastening devices are required.

The mode of operation of the torsional vibration damper is similar to that of other elastomer-viscous dampers. Namely, as the crankshaft of an internal combustion engine rotates about axis 20, it carries flange 18 therewith and thus the two-piece hub also undergoes the same torsional vibrations as it is rotating. Because of the elastic connection between the hub and the inertia ring 12, there will be a phase lag, phase difference, or annular lag between the oscillations of the hub and the corresponding oscillations transmitted to ring 12 by the elastic members 50 and 58. This phase difference or phase lag according to the present theory gives rise to the conversion of energy from the form of mechanical energy to the form of heat energy, thus tending to diminish the mechanical energy which would otherwise be available to exert undesired forces on the crankshaft and thereby shorten its life or make necessary a larger crankshaft. The viscous damping fluid in chamber 36 cooperates with the opposing facing surfaces of tongue 14 and the two hub faces 28 and 34 to further damp torsional vibrations. The manner in which viscous liquids damp torsional vibrations in such dampers is well known in the art.

The reader will observe that the tongue 14 axially locks the inertia member 12 relative to the hub and clamping ring and thus precludes relative axial excursions between these elements. The elastomer members are maintained compressed (distorted) by the retaining forces of the clamp ring 30 after assembly. If desired for a specific application, an adhesive bond may be provided between one or both elastomer members and an associated contacting surface. It will further be observed that elastomer elements 50 and 58 need not be of the same thickness, nor need they be of the same properties. Thus, one may be selected for its high resistance to torque and the other for its high conversion of rotary oscillations into heat. The inertia and hub members are usually formed of metal, although non-metal material such as a reinforced plastic may be employed for the hub.

What is claimed:

1. A torsional vibration damper including,
   (a) an annular inertia ring,
   (b) a radially inwardly extending tongue carried by the inertia ring and integral therewith,
   (c) a pair of annular elastomer members having radially extending portions thereof which sandwich the tongue,
   (d) a two-piece annular hub,
   (e) the two-piece hub sandwiching the tongue and a portion of the elastomer members, the remaining portions of the elastomer members extending in a generally axial direction and being sandwiched by the two-piece hub and the inertia ring, the two elastomer members being in compression normal to their surfaces which are in surface contact with the hub and inertia ring,
   (f) a radially innermost annular cavity in the hub, the radially innermost portion of said tongue extending into said radially innermost annular cavity,
   (f) said radially innermost annular cavity containing a viscous damping liquid, whereby the inertia ring tongue cooperates with the viscous liquid to damp torsional vibrations of the hub, and whereby the elastomer members cooperate with the inertia ring and hub to also damp torsional vibrations of the hub.

2. The torsional vibration damper of claim 1 wherein the axial extent of each of the radially extending portions of the elastomer members is greater than the clearance between the sides of the tongue and the facing portions of the hub.

3. The torsional vibration damper of claim 1 wherein said inertia ring tongue is angularly continuous.

* * * * *